United States Patent Office 3,232,934
Patented Feb. 1, 1966

3,232,934
OMEGA-(1-AMINO-5 AND 8-ANTHRAQUINONYL-AMINO)-1-AMMONIUM ALKANES OF 2 TO 3 CARBON ATOMS
Robert C. Hoare, Hamburg, N.Y., assignor to Allied Chemical Corporation, New York, N.Y., a corporation of New York
No Drawing. Original application June 25, 1959, Ser. No. 822,746. Divided and this application Sept. 22, 1961, Ser. No. 139,889
4 Claims. (Cl. 260—247.1)

This invention relates to dyestuffs of the anthraquinone series. More particularly, it relates to quaternary ammonium derivatives of amino-anthraquinones for dyeing yarns and textiles containing polyacrylonitrile fibers.

This application is a division of application Serial No. 822,746, filed on June 25, 1959, now abandoned.

Since the introduction into commerce of yarns and textiles containing fibers of polymers and copolymers of acrylonitrile (hereinafter, for the sake of brevity, referred to as acrylic fibers), much research effort has been devoted to the development of dyes for the dyeing of yarns and textiles containing these synthetic fibers alone or in admixture with other fibers. Various diamino-anthraquinone derivatives have been proposed for this purpose. However, several such derivatives, e.g. 1-methylamino-4-substituted alkyl-amino-anthraquinones, have been found to be of inferior light fastness on acrylic fibers or to exhibit such a slow rate of dyeing that they could not be used satisfactorily along with other dyes employed for acrylic fibers (United States Patent 2,716,655, granted August 30, 1955).

It is among the objects of the present invention to provide dyestuffs of the anthraquinone series for coloring acrylic fibers (including yarns and textiles containing such fibers alone or admixed with other fibers), which dyestuffs produce colorations fast to washing and to light.

It is another object of this invention to provide such anthraquinone dyestuffs capable of producing colorations on acrylic fibers in red and reddish brown shades.

These and other advantages incidental thereto will be apparent from the following description of the present invention.

The dyestuffs of the present invention are represented by the formula:

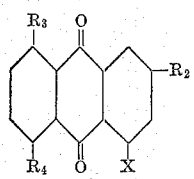

wherein $R_2$ is hydrogen, halogen, methyl or methoxy; $R_3$ and $R_4$ are each hydrogen, amino, alkoxyalkyleneamino having from 1 to 3 carbon atoms in the alkoxy group and from 2 to 3 carbon atoms in the alkylene chain or cyclohexylamino; $R_3$ and $R_4$ may be the same or different substituents and at least one of $R_3$ and $R_4$ is either amino, alkoxyalkyleneamino or cyclohexylamino; and X is

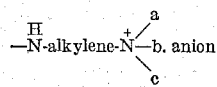

in which alkylene is a methylene chain having from 2 to 4 carbon atoms; "$a$" is methyl, ethyl or a morpholino group of which the nitrogen atom and "$b$" are also parts; "$b$" is methyl, ethyl or a morpholino group of which the nitrogen atom and "$a$" are also parts; "$c$" is methyl or ethyl, and "anion" can be an organic or inorganic anion.

The $R_2$ halogen substituent may be chlorine, bromine or fluorine.

The $R_3$ or $R_4$ alkoxyalkyleneamino may be ethoxyethyleneamino, methoxypropyleneamino or propoxypropyleneamino.

The dyestuffs of the present invention are obtained by condensing an anthraquinone derivative corresponding to the desired dyestuff containing a replaceable substituent in the X position in the above formula, such as, for example, as halogen or nitro substituents, with a suitable diamine in the presence of a condensing agent, e.g. copper powder and an acid binding agent, e.g. sodium carbonate, and reacting the resulting product with a quaternizing agent, e.g. dimethyl sulfate, to form the cationic dyestuff.

Instead of dimethyl sulfate as the quaternizing agent, other lower alkyl sulfates such as diethyl or dipropyl sulfates, lower alkyl halides such as butyl iodide, aralkyl halides such as benzyl chloride, and lower alkyl esters of organic sulfonic acids such as propyl toluene sulfonate, can be used.

The solvent used in the quaternizing step can be selected from those in which the color base is soluble and which are relatively unreactive toward the quaternizing agent. Among the solvents that can be employed in this step may be mentioned tertiary butanol, trichlorobenzene, xylenes and benzene.

The volume of the solvent is not critical. The solvent functions to provide a fluid reaction mass and the amounts used can be varied considerably. The use of large quantities of solvent is objectionable, however, because it is wasteful and expensive.

Inasmuch as the quaternization occurs at ambient or slightly elevated temperatures, it is preferred to carry out this step at moderate temperatures, i.e., at temperatures below 65° C. Higher temperatures can be used, although in the presence of primary and secondary amino groups reaction of the quaternizing agent with these substituents of the anthraquinone compound when present, should be avoided.

The dyeing of acrylic fibers with cationic dyes involves a simple ion exchange phenomenon in which the cation from the dyestuff replaces the anion contributed by the polyacrylonitrile residue. Hence it is evident that the dyestuff anion serves merely to assist in the solubilization of the dyestuff in the dyebath. Accordingly the anion of the cationic dyestuff can be varied considerably without affecting materially the application and coloration properties of the dyestuffs.

The dyeing of textiles or yarns containing acrylic fibers with the dyestuffs of this invention is carried out from aqueous dyebaths, the pH of which is preferably slightly acid, i.e., about pH 4.5 and 5.5, although pH ranges of 3 to about 10 can be used. Minor changes in the dyeing method materially affect the quality of the dyeing produced, e.g., a dyeing made from a boiling pH 5 bath which has excellent light fastness may have poor fastness to light when produced from a more strongly acid (pH 3) bath. The most favorable conditions for any of the dyestuffs coming within the scope of the invention can readily be ascertained by a few trial experiments.

The following examples are given for illustrative purposes. It will be understood that this invention is not limited to these examples. In the examples all parts are on a weight basis and the temperatures are given in ° C.

Example 1

A mixture of 157 parts of butyl alcohol, 25 parts of aminoethyl morpholine, 0.8 part of cuprous acetate and 13.5 parts of potassium acetate was heated to 80° to 85°. At this temperature and slowly over ½ to 1 hour, were added 35 parts of 1,5-aminochloroanthraquinone. The temperature of the mixture was raised from 95° to 105° and maintained thereat for about 16 hours. The mixture was filtered hot (above 90°) and the sludge cake was washed color free with hot (above 90°) butyl alcohol. The clarified filtrate was cooled to about 55° and to it was added 30.8 parts dimethyl sulfate drop-wise over about 2 hours. The mixture was agitated at 60° for about one hour and the resultant slurry was filtered. The filter cake was washed with 156 parts cold (20°) butyl alcohol and the washed cake was dried at 55° to 60°. Thus there were obtained 7.7 parts of 2(1-amino-5-anthraquinonlylamino) ethyl-N-methylmorpholinium methyl sulfate having the formula:

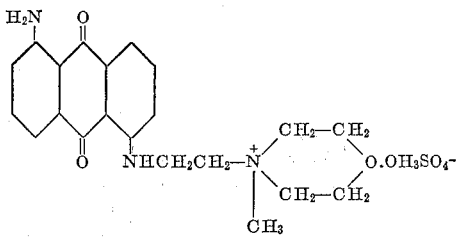

This dyestuff dyes acrylic textile (Orlon) from a slightly acid bath (pH 5) at boiling temperature in reddish brown shades having good fastness properties both to light and to washing.

Example 2

A mixture of 50 parts of 1-nitro-5-chloroanthraquinone, 15 parts of urea, 56.5 parts of 2-methoxyethylamine and 312 parts of 2B alcohol (denatured ethanol) was heated to and maintained boiling under reflux for 48 hours. Thereafter an additional 15 parts of urea together with 200 parts of n-butyl alcohol were charged and the mixture maintained at the boil for about 16 hours. The alcohol was distilled from the mixture, which then was sludge filtered. The sludge was reslurried in 800 parts of n-butyl alcohol at the boiling temperature and then filtered. The filtrates were combined and cooled to 0°. The resultant slurry was filtered and the product, 1-methoxyethylamino-5-chloroanthraquinone was dried in vacuo at 50° to 60°. About 27 parts of this intermediate product were obtained.

A mixture of 12.5 parts of 3-dimethylaminopropylamine, 0.4 part of copper acetate, 7.0 parts of potassium acetate and 80 parts of n-butyl alcohol was heated to 80° to 85°. At this temperature, 21.4 parts of 1-methoxyethylamino-5-chloroanthraquinone were added and the mixture was heated to and maintained at 95° to 105° for about 16 hours.

The mass was sludge filtered, the sludge cake washed free of color with about 80 parts of hot n-butanol. The filtrates were cooled to 0°, and the slurry of product was filtered and dried in a vacuum oven at 50° to 60°. Thusly, 7.7 parts of 1-methoxyethylamino-5-(3'-dimethylaminopropylamino)-anthraquinone were obtained.

The dried product was suspended in about 65 to 70 parts of chlorobenzene and 6.65 parts of dimethyl sulfate added. The mixture was agitated at ambient temperature for about 16 hours, and then filtered. The filter cake was washed with chlorobenzene and dried in a vacuum oven at 50° to 60°. The dried product 3(1-methoxyethylamino-5-anthraquinonylamino) - propyl trimethylammonium methyl sulfate having the formula:

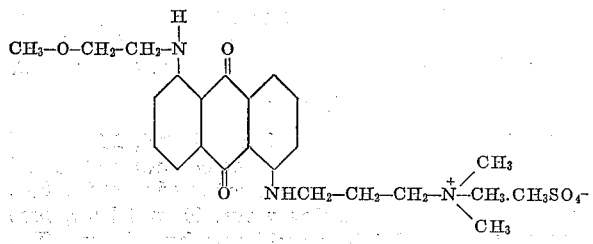

which was obtained in a yield of 4.4 parts, dyes acrylic fibers in red shades fast to washing and to light.

Example 3

A mixture of 50 parts of 1-nitro-5-chloroanthraquinone, 15 parts of urea, 45 parts of cyclohexylamine and 320 parts of 2B alcohol was agitated and heated to and maintained boiling under reflux for 48 hours. An additional 15 parts of urea and 200 parts of n-butyl alcohol were charged and the mixture heated at 100° to 105° for about 16 hours, permitting the 2B alcohol to distill from the mass.

The resultant slurry was filtered hot and the sludge was washed with about 80 parts of hot n-butyl alcohol. The filtrates were cooled to 0° and the precipitate was separated by filtration. The product, 1-cyclohexylamino-5-chloroanthraquinone was dried in a vacuum oven at 50° to 60° and weighed 43.5 parts.

To a hot (80° to 85°) mixture of 19 parts of 3-dimethylaminopropylamine, 0.6 part of copper acetate, 10.5 parts of potassium acetate and 120 parts of n-butyl alcohol, 35 parts of 1-cyclohexylamino-5-chloroanthraquinone were added. The mixture was heated at 95° to 105° for about 16 hours.

The mixture was sludge filtered, washed with 80 parts of hot butyl alcohol and the filtrates were cooled to 0°. The resultant slurry was filtered and the solid, 1-cyclohexylamino - 5(3' - dimethylaminopropylamino)anthraquinone weighed 11.5 parts after being dried in vacuo at 50° to 60°.

The dried product was suspended in about 110 parts of dry chlorobenzene and 13.3 parts of dimethylsulfate were added to the slurry. The mixture was held at ambient temperature for about 16 hours, then filtered and washed with chlorobenzene. The product was dried at 50° to 60° in vacuo. Thusly, there were obtained 12.7 parts of 3-(1-cyclohexylamino-5-anthraquinonylamino) propyltrimethylammoniummethyl sulfate having the formula:

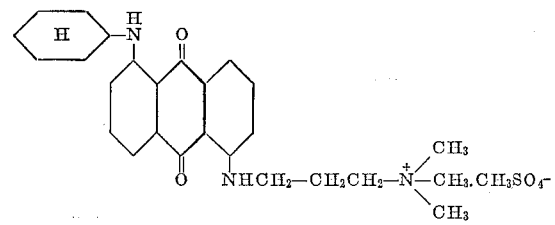

which dyed acrylic fibers from an acid bath (pH 4 to 5) at the boil in clear red shades of good fastness to washing and to light.

Example 4

3 - (1 - amino-8-anthraquinonylamino)propyltrimethylammonium methyl sulfate was prepared in substantially the same manner described in Example 1 above, utilizing the corresponding 8-bromo substituted anthraquinone and employing dimethyl sulfate as the quaternizing agent, the product having the formula:

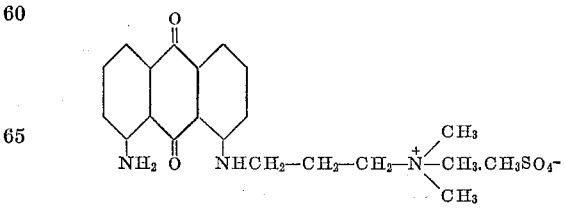

dyed acrylic fibers in reddish brown shades which were fast to washing and to light.

The dyestuffs of the above examples were applied to textiles containing acrylic fibers (Orlon) using a mildly acid aqueous dyebath (pH 5) at a temperature of 100°, producing the shades indicated; the dyed fabrics were fast to washing and to light.

As noted above, 1-methylamino-4-substituted alkylaminoanthraquinones have been found to be of inferior light fastness on acrylic fibers. It is, therefore, indeed surprising and unexpected that dyestuffs of the present invention (having the identified substituents in the specified locations on the anthraquinone nuceus) produce colorations on acrylic fibers fast to washing and to light.

While an important use of the dyestuffs hereinabove described is the coloration of acrylic fibers, it will be appreciated this invention is not limited to such use.

Since certain changes may be made in the above described dyestuffs without departing from the scope of this invention, it is intended that all matter contained in the above description shall be interpreted as illustrative and not in a limiting sense.

What is claimed is:

1. The compound of the formula:

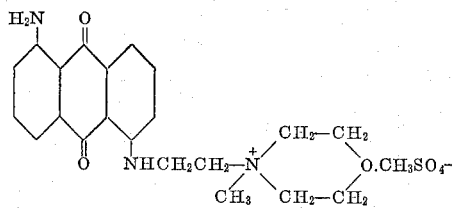

2. The compound of the formula:

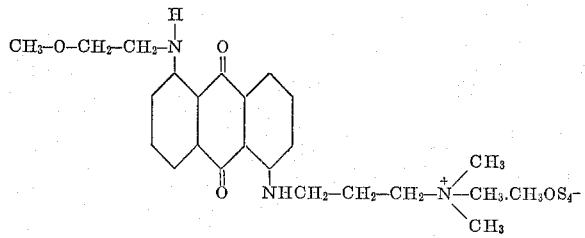

3. The compound of the formula:

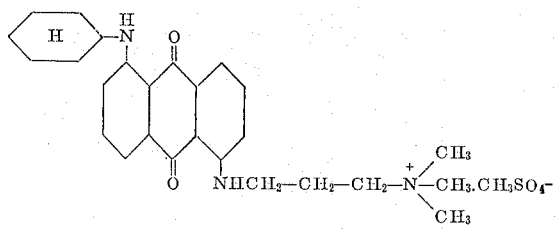

4. The compound of the formula:

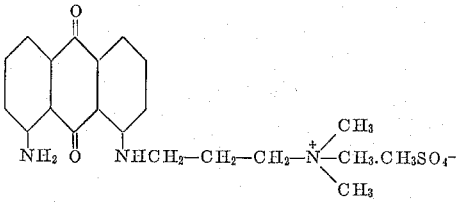

References Cited by the Examiner
UNITED STATES PATENTS

| | | | |
|---|---|---|---|
| 2,051,005 | 8/1936 | Koeberle et al. | 260—378 |
| 2,220,129 | 11/1940 | Stott | 8—55 |
| 2,255,045 | 9/1941 | Dickey et al. | 260—239 |
| 2,430,771 | 11/1947 | Kern | 260—247.1 |
| 2,611,772 | 9/1952 | Allen et al. | 260—378 |
| 2,727,045 | 12/1955 | McSheehy | 260—378 |
| 2,901,479 | 8/1959 | Baumann et al. | 260—247.1 |
| 2,992,063 | 7/1961 | Hadfield et al. | 8—55 |

FOREIGN PATENTS

| | | |
|---|---|---|
| 714,986 | 12/1941 | Germany. |
| 807,241 | 1/1959 | Great Britain. |

NICHOLAS S. RIZZO, *Primary Examiner.*

IRVING MARCUS, BENJAMIN SWEEDLER, WALTER A. MODANCE, *Examiners.*